(12) United States Patent
Isenberg et al.

(10) Patent No.: US 10,278,541 B2
(45) Date of Patent: *May 7, 2019

(54) BLADE ARRANGEMENT FOR A FOOD PROCESSING VAT

(71) Applicant: Custom Fabricating & Repair, Inc., Marshfield, WI (US)

(72) Inventors: Timothy J. Isenberg, Marshfield, WI (US); John E. Zirbel, Marshfield, WI (US)

(73) Assignee: Custom Fabricating & Repair, Inc., Marshfield, WI (US)

( * ) Notice: Subject to any disclaimer, the term of this patent is extended or adjusted under 35 U.S.C. 154(b) by 305 days.

This patent is subject to a terminal disclaimer.

(21) Appl. No.: 14/793,200

(22) Filed: Jul. 7, 2015

(65) Prior Publication Data

US 2015/0305563 A1     Oct. 29, 2015

Related U.S. Application Data

(63) Continuation of application No. 13/088,934, filed on Apr. 18, 2011, now Pat. No. 9,073,019.

(Continued)

(51) Int. Cl.
*B01F 7/00* (2006.01)
*B01F 7/04* (2006.01)
(Continued)

(52) U.S. Cl.
CPC .............. *A47J 43/044* (2013.01); *A01J 25/06* (2013.01); *A47J 43/0711* (2013.01);
(Continued)

(58) Field of Classification Search
CPC .. A47J 43/044; A47J 43/0711; B01F 7/00283; B01F 7/00275; B01F 7/042; B01F 2215/0014; B01F 15/00714; A01J 25/06
See application file for complete search history.

(56) References Cited

U.S. PATENT DOCUMENTS 2,009,238 A     7/1935  Parsons
2,029,691 A     2/1936  Robinson
(Continued)

FOREIGN PATENT DOCUMENTS

AT      384523      11/1987
DE     1150360       6/1963
(Continued)

OTHER PUBLICATIONS

"Horizontal Cheese Vat (HCV)" Brochure, Sherping Systems, undated.
(Continued)

*Primary Examiner* — Lore R Jarrett
(74) *Attorney, Agent, or Firm* — Boyle Fredrickson, S.C.

(57) ABSTRACT

A food processing vat is provided with blade assemblies that extend from opposing sides of a rotating shaft. The blade assemblies may be curved or otherwise face different directions at different locations along their respective lengths. The vat may have a pair of rotating shafts and the rotation of the shafts may be timed so that the blade assemblies of the shafts simultaneously travel through a common swept volume. The blade assemblies may be positioned on the shafts so that they intermesh through each other while simultaneously moving through the common volume.

13 Claims, 11 Drawing Sheets

Related U.S. Application Data

(60) Provisional application No. 61/325,612, filed on Apr. 19, 2010.

(51) Int. Cl.
*A01J 25/06* (2006.01)
*A47J 43/07* (2006.01)
*B01F 15/00* (2006.01)
*A47J 43/044* (2006.01)

(52) U.S. Cl.
CPC ...... *B01F 7/00275* (2013.01); *B01F 7/00283* (2013.01); *B01F 7/042* (2013.01); *B01F 15/00714* (2013.01); *B01F 2215/0014* (2013.01)

(56) References Cited

U.S. PATENT DOCUMENTS

| | | | |
|---|---|---|---|
| 2,726,852 A * | 12/1955 | Sommer | B01F 7/022 366/19 |
| 3,498,762 A | 3/1970 | Van Der Schee et al. | |
| 3,580,162 A | 5/1971 | Pontecorvo | |
| 3,640,509 A | 2/1972 | Inamura et al. | |
| 3,734,468 A | 5/1973 | Chang et al. | |
| 3,752,447 A | 8/1973 | Chen | |
| 3,858,855 A | 1/1975 | Hazen | |
| 3,927,983 A | 12/1975 | Gordon et al. | |
| 3,964,874 A | 6/1976 | Maruko et al. | |
| 4,004,785 A | 1/1977 | Kajimoto et al. | |
| 4,050,369 A | 9/1977 | Mulvihill et al. | |
| 4,108,058 A | 8/1978 | Sjoholm et al. | |
| 4,130,053 A | 12/1978 | Sjoholm et al. | |
| RE29,967 E | 4/1979 | Hazen | |
| 4,206,880 A | 6/1980 | Stanton | |
| 4,312,596 A | 1/1982 | Maezawa et al. | |
| 4,321,860 A | 3/1982 | Hazen | |
| 4,493,557 A | 1/1985 | Nayak et al. | |
| 4,584,934 A | 4/1986 | De Fockert | |
| 4,612,853 A | 9/1986 | Kostiainen et al. | |
| 4,776,703 A | 10/1988 | Oda et al. | |
| 4,859,074 A | 8/1989 | Asai et al. | |
| 4,893,554 A | 1/1990 | Gasbjerg | |
| 4,938,424 A | 7/1990 | Pittelko | |
| 4,989,504 A | 2/1991 | Jay | |
| 5,178,060 A | 1/1993 | Rusch et al. | |
| 5,178,459 A | 1/1993 | Christensen | |
| 5,513,559 A | 5/1996 | Jay | |
| 5,606,907 A | 3/1997 | Jay | |
| 5,953,983 A | 9/1999 | McCormick et al. | |
| 5,985,347 A | 11/1999 | Ejnik | |
| 6,257,129 B1 | 7/2001 | Sipma et al. | |
| 6,367,375 B2 | 4/2002 | Sipma et al. | |
| 6,418,836 B2 | 7/2002 | Sipma et al. | |
| 6,539,845 B2 | 4/2003 | Sipma et al. | |
| 7,305,917 B2 | 12/2007 | Sipma et al. | |
| 2001/0019515 A1 | 9/2001 | Schmidt et al. | |
| 2003/0147304 A1 | 8/2003 | Schuchardt et al. | |
| 2006/0081133 A1 | 4/2006 | Schmitz | |
| 2006/0181959 A1 * | 8/2006 | Weiss | B01F 7/042 366/97 |
| 2006/0251554 A1 | 11/2006 | Doucet et al. | |
| 2007/0277680 A1 | 12/2007 | van der Meulen | |
| 2008/0047442 A1 | 2/2008 | Sipma et al. | |
| 2008/0094939 A1 | 4/2008 | Wenger et al. | |
| 2008/0127834 A1 | 6/2008 | Bokelmann et al. | |
| 2008/0130406 A1 | 6/2008 | Rosso et al. | |
| 2008/0131313 A1 | 6/2008 | Bokelmann et al. | |
| 2008/0131570 A1 | 6/2008 | Bokelmann et al. | |
| 2015/0165398 A1 * | 6/2015 | Takemoto | B01F 7/001 366/83 |
| 2015/0320007 A1 * | 11/2015 | Hamm | A01J 25/02 426/518 |

FOREIGN PATENT DOCUMENTS

| | | |
|---|---|---|
| DE | 2002428 | 7/1971 |
| DE | 3037333 | 5/1982 |
| EP | 0770333 | 7/2000 |
| FR | 877964 | 1/1943 |
| GB | 189502 | 11/1922 |
| GB | 1313075 | 4/1973 |
| NZ | 209238 | 8/1986 |
| NZ | 230774 | 6/1991 |
| WO | 8904116 | 5/1989 |
| WO | 9200665 | 1/1992 |
| WO | 9422294 | 10/1994 |

OTHER PUBLICATIONS

"The Unique Concept of the Scherping HCV has Many . . . ", 1 page, undated.
"Cheese Vat, Performance Advantages Over Other Cheese Vats", 7 page, undated.
"The Horizontal Cheese Vat is an integral piece in a line of state-of-the-art cheese making equipment that will help your plant achieve the quality standard of cheese and the profits you demand", Scherping Systems 9/00, 2000.
"The Ultimate Tracking, Maintenance Management Data Acquisition System Your Plant Can Have", Scheming Systems, undated.
"Scherping's Data Acquisition/Plant Management System gives you your plant's progress at a moments notice right at your fingertips", Scherping Systems, Sep. 1977.
EP Appln. No. 11162954.9 Nov. 10, 2011, Partial Search, 9 pages.
EP Appln. No. 11162954.9, Mar. 19, 2012, Communication, 13 pages.
EP Appln. No. 11162954.9, Apr. 23, 2012, EPO Communication, 2 pages.
EP Appln. No. 11162954.9, Dec. 5, 2012, EPO Communication, 5 pages.
EP Appln. No. 11162954.9, Jul. 26, 2013, EPO Communication, 5 pages.

* cited by examiner

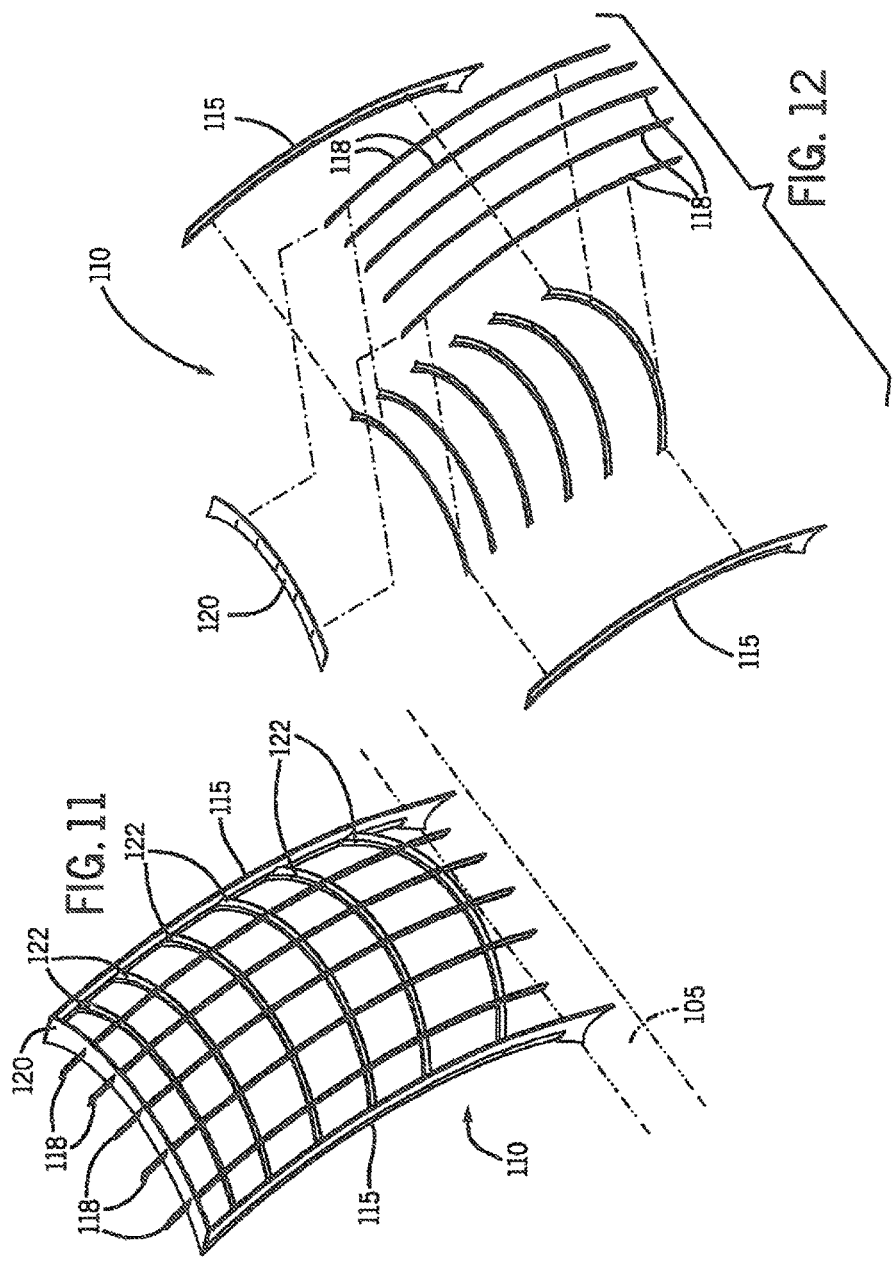

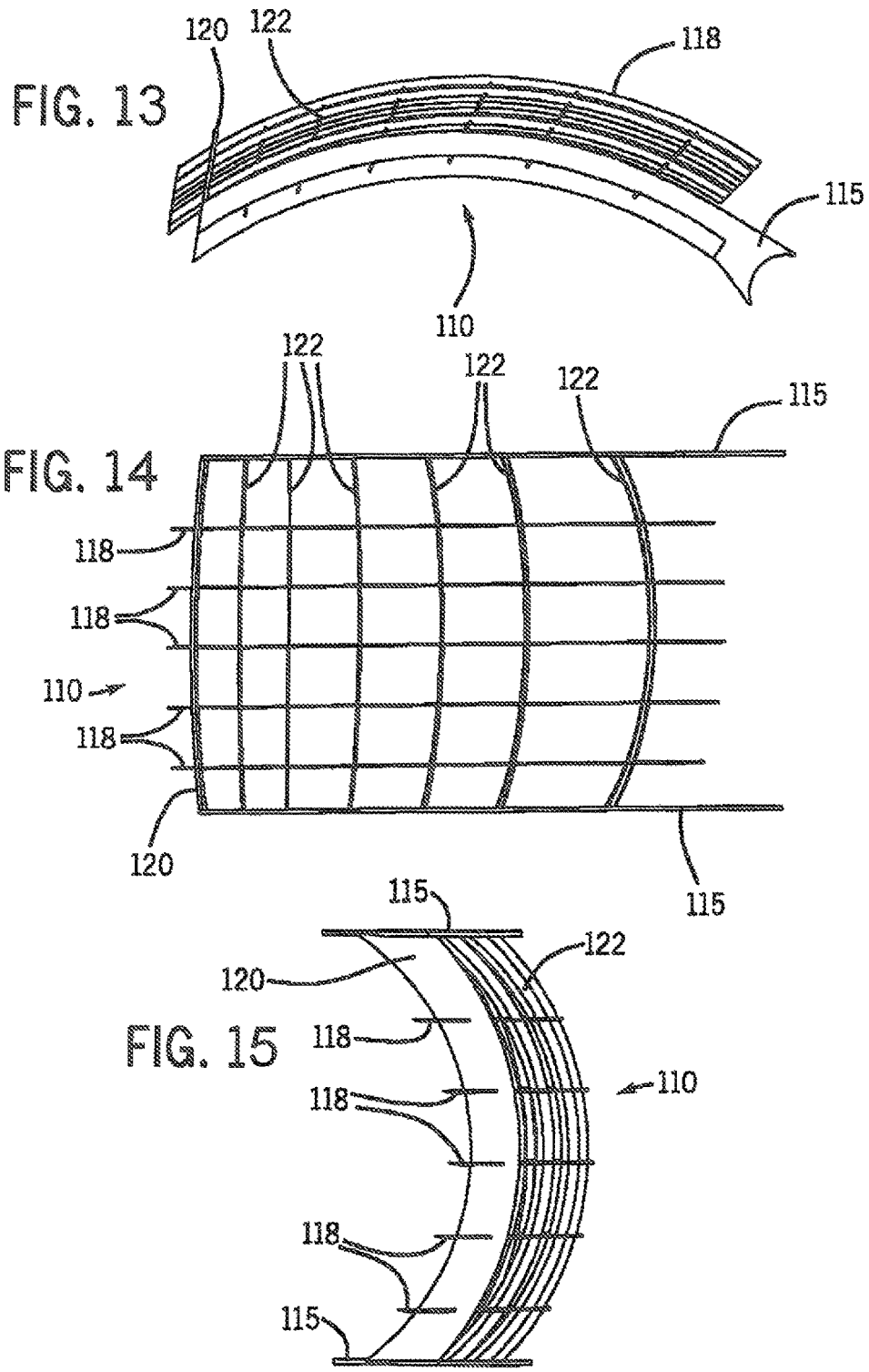

BLADE ARRANGEMENT FOR A FOOD PROCESSING VAT

CROSS-REFERENCE TO RELATED APPLICATIONS

This application is a continuation of U.S. application Ser. No. 13/088,934, filed Apr. 18, 2011, which claims priority from U.S. Provisional Patent Application Ser. No. 61/325,612, filed on Apr. 19, 2010, the entirety of which is expressly incorporated by reference herein.

BACKGROUND OF THE INVENTION

1. Field of the Invention

The invention relates to food processing vats and, more particularly, to agitation and cutting systems of food processing vats.

2. Discussion of the Related Art

Agitation and cutting systems for use in food processing vats are known in the food processing industries. Such systems are widely used in equipment for processing semi-liquid food products, such as cheese vats.

Agitation and cutting systems used in cheese vats typically have panels mounted on and rotating with shafts. The panels have sharp edges on one surface and dull edges on an opposing surface. This allows the panels to rotate in the direction(s) that the sharp edges face to cut the contents of the food processing vat. Rotating the panels in the opposite direction(s), which the dull edges face, is done to stir the contents of the cheese vat.

SUMMARY OF THE INVENTION

The inventors have recognized that in typical vats having two horizontal shafts, the agitators of the two shafts pass through a common swept volume in an alternating sequence from opposing sides of the vat. The inventors have also recognized that (i) such passing the agitators of the two shafts in an alternating sequence through the common swept volume imparts alternating directional changes to the vat contents moving within the vat, (ii) after each directional change, the vat contents and the respective agitator move in the same direction, and (iii) the efficiency of cutting or stirring when the agitator and vat contents move in the same direction is less than if they are moving in different directions. The inventors have further recognized that with typical flat-panel agitators, when the agitator and vat contents move in the same direction, e.g., circumferentially around a shaft that supports the flat-panel agitator, the vat contents move with a centrifugally directed flow component which forces the contents radially away from the shafts. The inventors have recognized that the centrifugal flow component imparts movement of the contents a direction that is tangential with the cutting or stirring surfaces of the flat-panel agitator, whereby the contents may at least partially slide outwardly along the flat-panel agitators, which may reduce the efficiency of the cutting or stirring. The inventors have also recognized that in typical vats, the agitators extend from a single side of or in substantially a single direction from the shafts and that this may cause rotational imbalances during use. The present invention contemplates a blade arrangement for a food processing vat that addresses these and other inventor identified problems and drawbacks of the prior art.

In accordance with an aspect of the invention, a food processing vat is provided with blade assemblies mounted on two horizontal shafts that define a common swept volume between them. Blade assemblies of the two shafts simultaneously move through the common volume, working the contents from both sides of the vat. This may enhance stirring or cutting of the contents by imparting a turbulent flow of the contents in the common volume which may ensure that the contents and blade assemblies are moving at least somewhat in different directions.

In accordance with another aspect of the invention, the blade assemblies define curved baskets and each shaft may include multiple curved baskets extending from it. Adjacent curved baskets on one shaft may be spaced from each other and in staggered alignment with corresponding spaced-apart curved baskets on the other shaft. This allows the multiple curved baskets of the pair of shafts to intermesh and simultaneously pass through the common volume between the shafts, whether the shafts rotate in the same or opposite directions, which may impart a cutting or stirring action that enhances turbulent flow of the vat contents in the common volume.

In accordance with another aspect of the invention, the blade assemblies extend generally in an axial direction away from the respective shafts. Each blade assembly faces different directions at different locations along its length. In this way, even if the vat contents and a blade assembly as a whole are moving in the same direction, since different portions of the blade assembly face different directions, the contents may be contacted by the different portions of the blade assembly in at least angularly different directions, which enhances cutting or stirring. Centrifugally flowing vat contents may encounter a portion of the blade assembly that faces angularly toward the shaft, such that the contents centrifugally flow in a direction which may be closer to normal with respect to that portion of blade assembly than tangential. This may enhance the cutting or stirring of the vat contents because the contents may be centrifugally forced through the blade assembly instead of sliding along it.

In accordance with another aspect of the invention, the blade assemblies have curved knives with different portions that face different directions along the length of the curved knives. The curved knives may cumulatively define a curved basket. The curved basket may be curved longitudinally and transversely so that it has a dished-in or concave side and an opposing dished-out or convex side. The longitudinal and transverse curvatures may be provided by curved longitudinal knives and curved transverse knives, respectively, of the curved basket. The curved baskets may enhance the cutting or stirring of the vat contents because the contents may be centrifugally forced through the curved basket instead of sliding along it.

In accordance with another aspect of the invention, a food processing vat is provided with blade assemblies that extend in opposing directions from the shaft(s). This may improve the rotational balance of the shaft(s) which may extend the use-life of bearings, bushings, and/or other shaft supporting structures.

In accordance with another aspect of the invention, the knife assemblies define curved baskets that extend in opposite directions, with respect to each other, from the shaft(s). The curved baskets may be mounted so that those extending in one direction are positioned as a result of a double reflection, a horizontal and a vertical reflection about the shaft when the shaft is viewed from an end view, with respect to the curved baskets extending in the opposite direction. The curved baskets that extend in opposite directions from the shaft, when viewed from an end view of the shaft, may define an S-shaped or sigmoidal profile so that their weights are substantially symmetrical about a centerline of the shaft. This may improve the rotational balance of the shaft during use.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the Drawings:

FIG. 11 is an isometric view of a blade assembly of the vat system of FIG. 1;

FIG. 12 is an exploded, isometric, view of the blade assembly of FIG. 11;

FIG. 13 is a side elevation view of the blade assembly of FIG. 11;

FIG. 14 is a front elevation view of the blade assembly of FIG. 11; and

FIG. 15 is a top plan view of the blade assembly of FIG. 11.

DETAILED DESCRIPTION OF THE INVENTION

Figure 1:
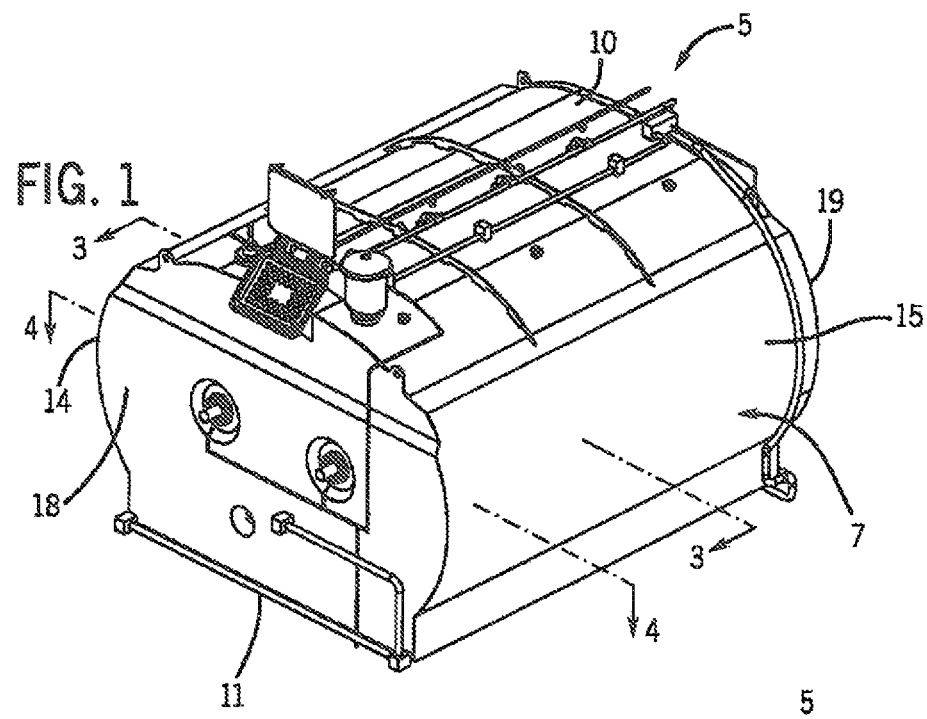
FIG. 1 is an isometric view from above and in front of a vat system incorporating a blade arrangement in accordance with the present invention.
Figure 2:
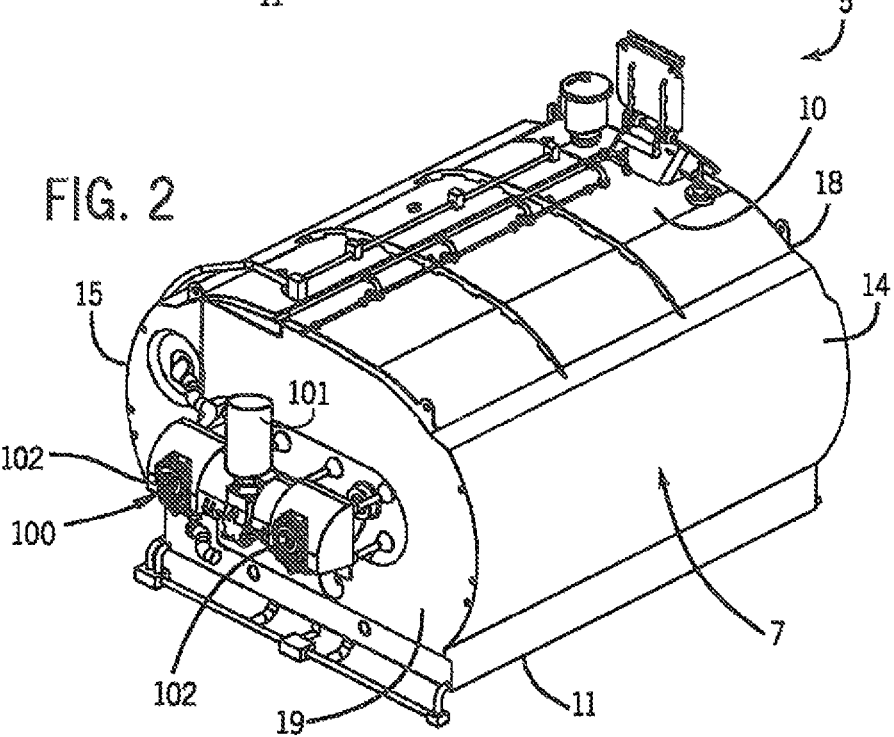
FIG. 2 is an isometric view from above and in back of the vat system of FIG. 1.

FIGS. 1 and 2 illustrate a vat system 5 that can be used for processing food and related products (collectively referred to as "vat contents") by mechanically manipulating and heating or cooling the vat contents, depending on the particular food or related product being processed. In a representative application, the vat system 5 may be used in the production of cheese, although it is understood that the vat system 5 may be used in processing other types of food products. The system 5 includes a vat 7 that has a heat transferring system to perform such heating and cooling, and an agitation system 100 (FIG. 2) that performs the mechanical manipulations tasks.

Figure 3:
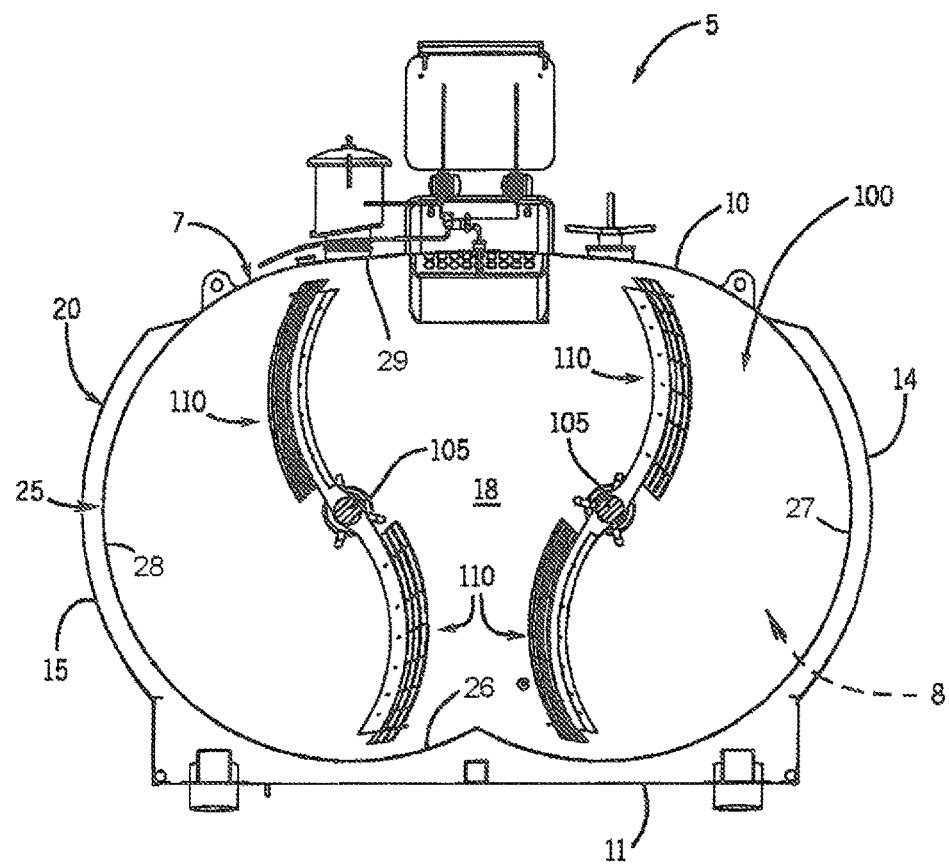
FIG. 3 is a sectional view of the vat system of FIG. 1, taken at line 3-3 of FIG. 1.

Referring now to FIGS. 1-4, vat 7 defines an enclosure having a top wall 10, a bottom wall 11, and side walls 14, 15, all of which extend longitudinally between a pair of end walls 18 and 19 (FIGS. 1 and 3). The walls 10, 11, 14, are 15 are multilayered, having an outer jacket 20 and an inner shell 25 that are spaced from each other as shown best in FIGS. 3 and 4. Insulation and various components of the heat transferring system are housed between the jacket 20 and shell 25. The shell 25 is the inmost structure of the vat 7, so that its inner surface surrounds and defines an outer periphery of a void or inside space 8 within the vat 7.

Figure 4:
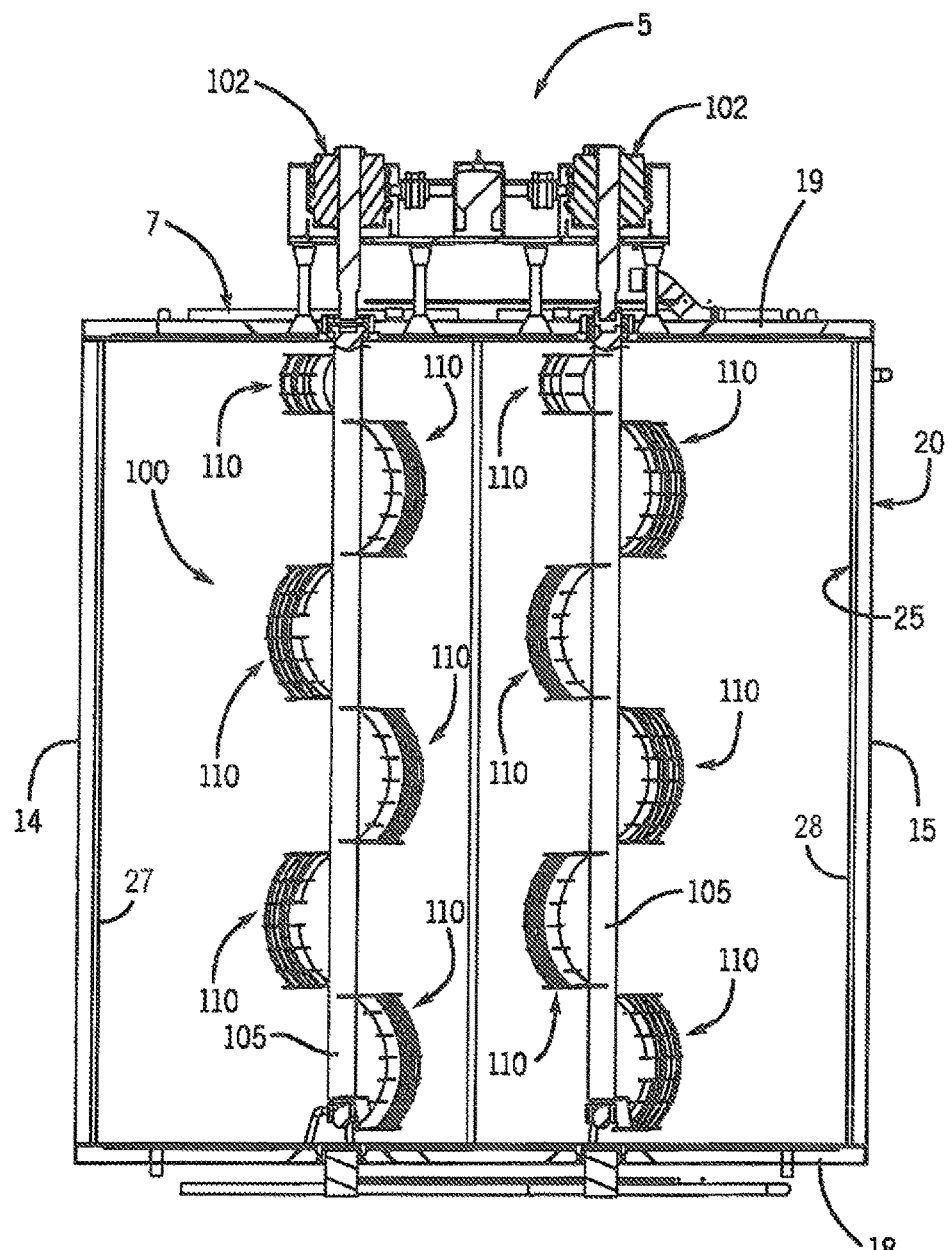
FIG. 4 is a sectional view of the vat system of FIG. 1, taken at line 4-4 of FIG. 1.

Referring now to FIGS. 3 and 4, a lower part of the inside space 8 resembles two horizontal parallel cylinders that transversely intersect each other, being defined by a bottom wall 26 (FIG. 3) of the shell 25 that has a pair of arcuate depressions which extend along the length of the vat 7, on opposing sides of a longitudinally extending raised middle segment. From the opposing sides of the shell bottom wall 26, opposing shell side walls 27, 28 extend in an outwardly bowed manner, arching away from each other in a transverse direction of the vat 7. A shell top wall 29 (FIG. 3) arcs gradually between top edges of the shell side walls 27, 28 and defines an upper perimeter of the inside space 8 of vat 7.

Figure 5:
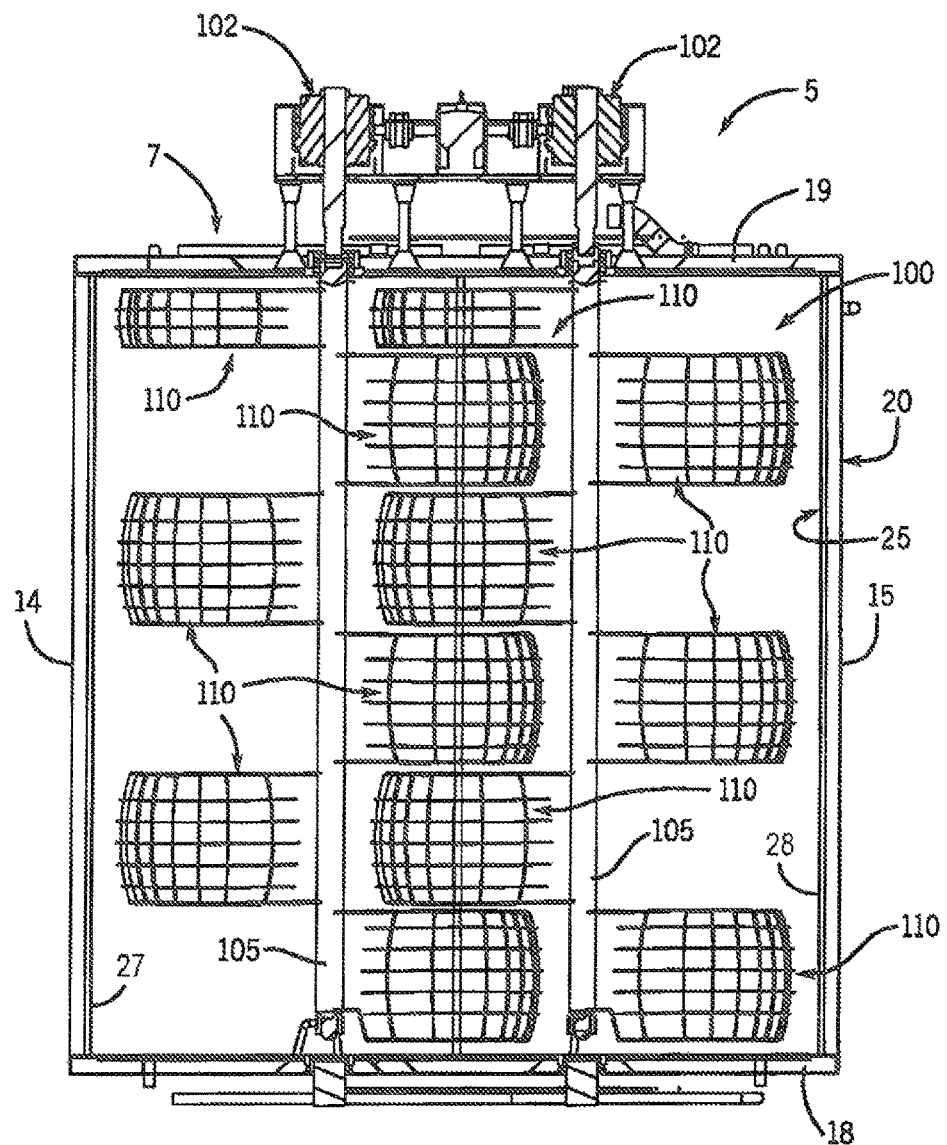
FIG. 5 is the sectional view of the vat system of FIG. 1 as shown in FIG. 4, with the blade assemblies rotated to a different position than that shown in FIG. 4.
Figure 6:
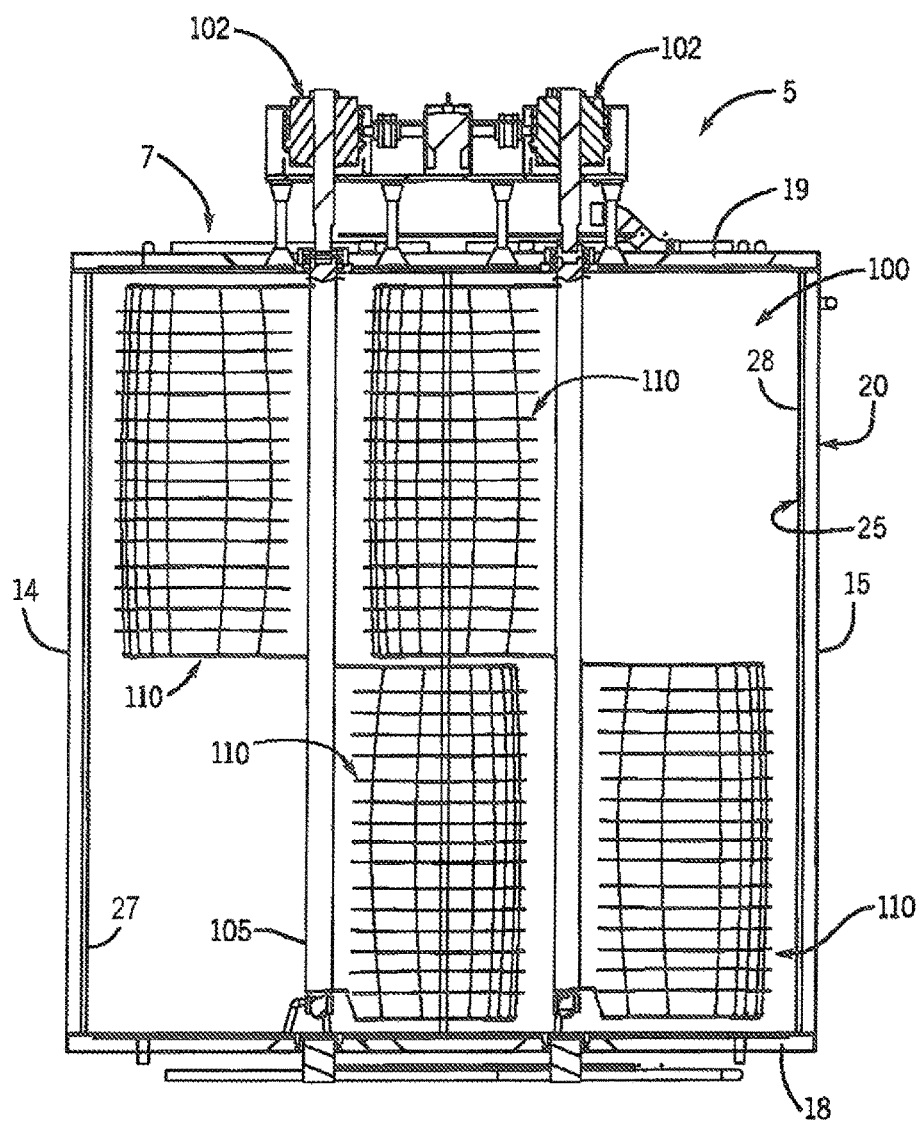
FIG. 6 is the sectional view of the vat system of FIG. 1 as shown in FIG. 4, with a variant of the blade assemblies.

Referring now to FIGS. 2, 4, and 5, agitation system 100 includes a motor 101 that delivers power to a pair of drives 102 that rotate a pair of shafts 105 that are parallel to and spaced from each other, extending between the end walls 18, 19. Each rotating shaft 105 has multiple blade assemblies 110 that extend generally radially from the shaft 105, in opposing directions. In the embodiment of FIGS. 4 and 5, on each shaft 105, the blade assembly 110 that is closest to the drive(s) 102 is narrower than the other blade assemblies 110. In the embodiment of FIG. 6, the blade assemblies 110 are substantially the same widths and are wider than the blade assemblies 110 shown in FIGS. 4 and 5. In another embodiment (not illustrated), the blade assemblies 110 are slightly wider than the wider blade assemblies 110 shown in FIGS. 4 and 5 so that the blade assemblies 110 collectively extend entirely between the end walls 18, 19 of the vat 7, without using narrower blade assemblies 110 near the drives 102 or elsewhere along the shafts 105. Respective common direction facing sets of blade assemblies 110 of the shafts 105 travel simultaneously through a common swept volume between the shafts.

Referring now to FIGS. 3-5, on each of the shafts 105, each blade assembly 110 is spaced from adjacent blade assemblies 110 on that shaft 105. The blade assemblies 110 of the two different shafts 105 are staggered with respect to each other along the lengths of the shafts 105. This staggered alignment of the blade assemblies 110 allows them to intermesh through each other (FIG. 5) while they travel through the common volume as the shafts 105 to which they are mounted rotate. Stated another way, the rotational timing and relative positions of the blade assemblies 110 and spaces between them of each shaft 105 correspond, in a staggered way, to the positions of the blade assemblies 110 and intervening spaces of the other shaft 105, allowing the respective sets of blade assemblies 110 to intermesh through each other (FIG. 5). FIG. 5 shows a point in the rotation of the shafts 105 in which the blade assemblies 110 of the shafts 105 intermesh with each other, by simultaneously pointing toward the other shaft 105, whereby each blade assembly 110 points toward the shaft 105 to which it is not mounted. At such point in the rotation of the shafts 105, while the blade assemblies 110 intermesh, substantially an entire area between the two shafts 105 is occupied with blade assemblies 110 that extend into such area from the two shafts and thus from different directions.

Referring now to FIG. 6, in this embodiment, each shaft 105 has two blade assemblies 110 which face in opposing radial directions with respect to the shaft 105. It is understood, however, that each shaft 105 may have any number of blade assemblies 110 along its length such as, for example, three, four or more blade assemblies 110. When the blade assemblies 110 of this embodiment intermesh, half of the area between the shafts 105 is occupied by a blade assembly 110 from one of the shafts 105 and the other half of the area between the shafts 105 is occupied by a blade assembly 110 from the other shaft 105.

Figure 8:
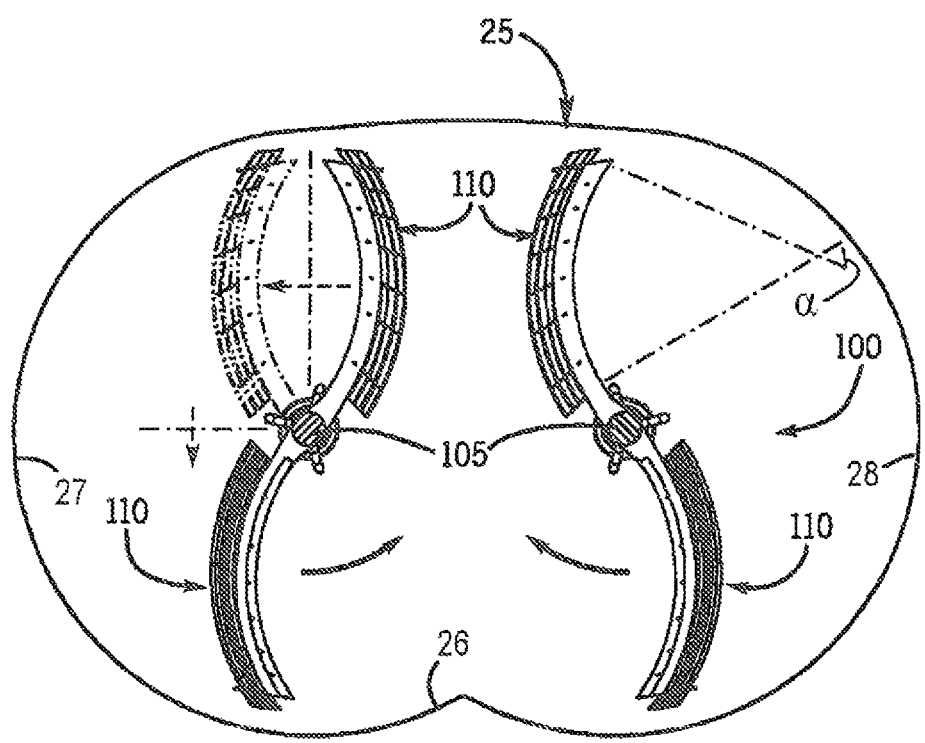
FIG. 8 is a partially schematic sectional view of the shell and a variant of the agitator system of the vat system of FIG. 1, facing toward the drives.
Figure 9:
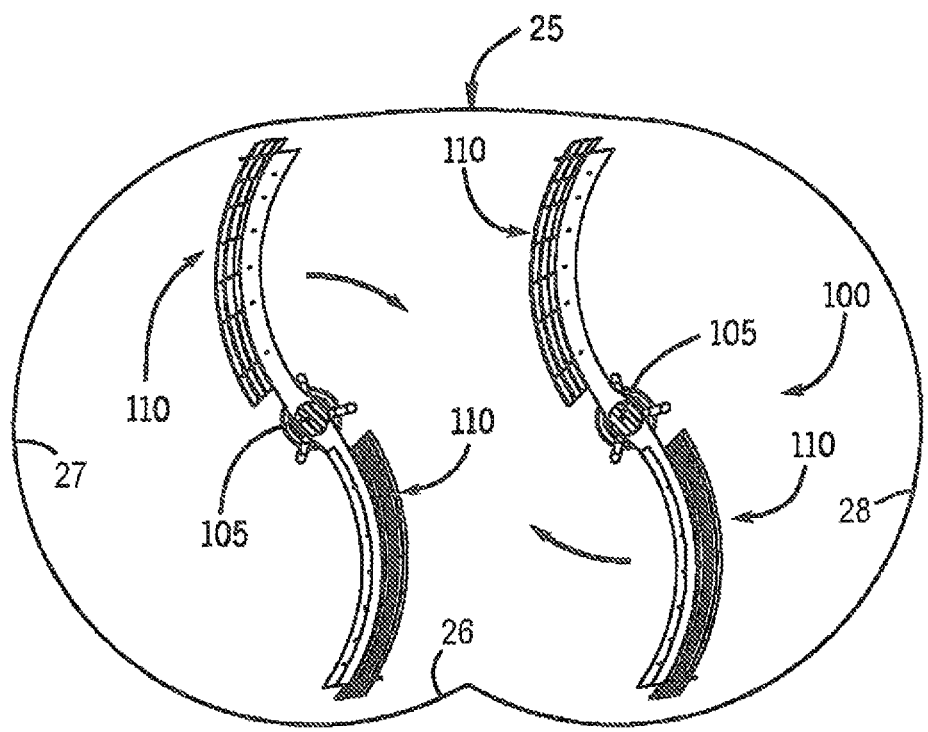
FIG. 9 is a partially schematic sectional view of the shell and another variant of the agitator system of the vat system of FIG. 1 facing toward the drives.
Figure 10:
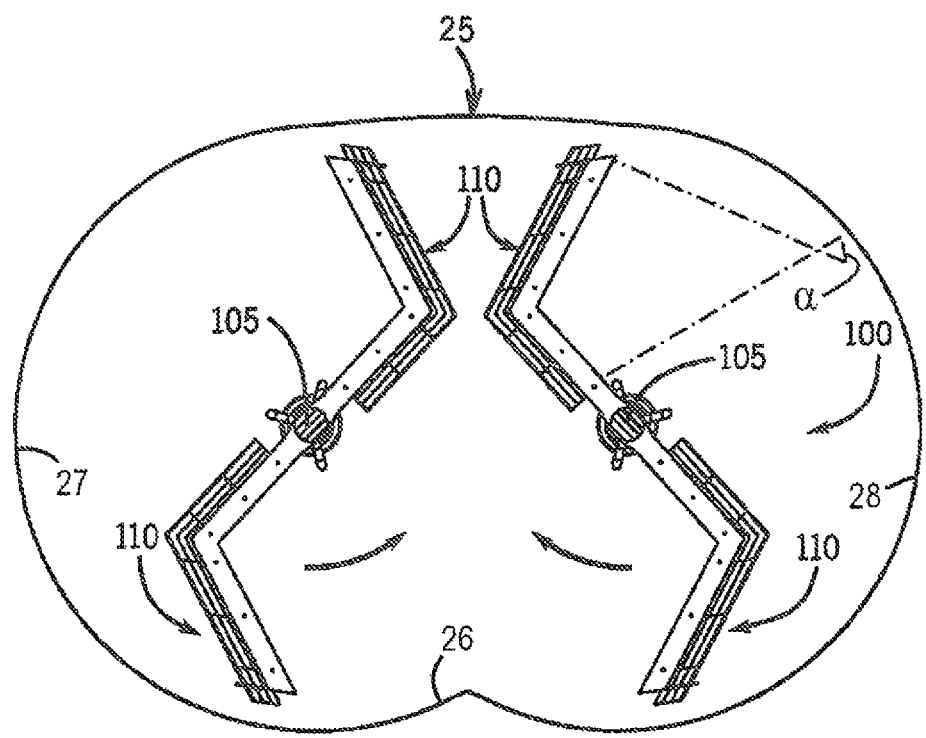
FIG. 10 is a partially schematic sectional view of the shell and another variant of the agitator system of the vat system of FIG. 1, facing toward the drives.

Referring now to FIGS. 8-10, each blade assembly 110 of these embodiments faces different directions at different locations along its length. In other words, the blade assemblies 110 are not flat when viewed from a side elevation. The embodiment shown in FIG. 10 has straight segments that angularly intersect, whereas the embodiments of FIGS. 8 and 9 are curved along their lengths, giving the blade assemblies curved profiles. As shown in FIGS. 8 and 10, an angle α of at least about 50 degrees, optionally at least about 60 degrees, is defined between the different directions faced by the blade assembly at the different locations. This is seen by the intersecting dashed lines that extend normal to the surfaces of the blade assemblies 110 and such different locations.

Still referring to FIGS. 8-10, on each shaft 105, the blade assemblies 110 extending in one direction are positioned as a result of a double reflection, a horizontal and a vertical reflection about the shaft 105. This is shown with dashed reflecting lines and arrows in FIG. 8, in which (i) a horizontal reflection of the left-side blade assembly 110 about a vertical axis extending though the shaft, and (ii) a vertical reflection of such horizontal reflection about a horizontal axis extending through the shaft are projected onto the right-side blade assembly. The double-reflected position of the blade assemblies 110 about the shaft 105 give the blade assemblies 110 a generally S-shaped or sigmoidal profile when viewed from an end view of the shaft 105.

Referring now to FIGS. 3 and 4, blade assembly 110 of this embodiment is curved along its length and along its width so that the corresponding curved length and width profiles define an overall curved basket configuration of the blade assembly 110. Accordingly, this blade assembly 110 (i) faces different directions at different locations along its length, and (ii) faces different directions at different locations along its width. Thus, lines projected normal to the blade assembly 110 at different locations along its width will extend in different directions, similar to the dashed arrows showing different facing directions along the length of the blade assembly 110, described above with respect to FIGS. 8 and 10. Furthermore, the blade assembly 110 of the embodiment shown in FIG. 10 may face different directions at different location across its width. For example, the blade assembly of FIG. 10 may be angled or V-shaped in cross-section, instead of being flat in cross-section like it is in some implementations of this embodiment.

Referring now to FIGS. 11-14, this blade assembly 110 includes two outer longitudinal knives 115 that connect to the shaft 105, defining the lateral outer sides of the blade assembly 110. Each of the outer longitudinal knives 115 has a wider bottom end that connects to the shaft. The wider bottom end has a curved cutout that corresponds in shape to the contour of the outer circumferential surface of the shaft 105. Multiple intermediate longitudinal knives 118 that are spaced from each other are provided between the outer longitudinal knives 115. The intermediate longitudinal knives 118 have the same radius of curvature as the outer longitudinal knives 115. The intermediate longitudinal knives 118 are narrower, for example, about one-half or about one-third as wide, as the outer longitudinal knives 115.

Referring now to FIGS. 11 and 14, at the bottom of the blade assembly 110, the intermediate longitudinal knives 118 are spaced from the shaft 105, defining a generally rectangular opening between the (i) shaft 105, (ii) inwardly facing surfaces of the lower ends of the outer longitudinal knives 115, and (iii) lower ends of the intermediate longitudinal knives 118. At the top of the blade assembly 110, upper ends of the intermediate longitudinal knives 118 project beyond a transverse end knife 120 that connects the outer and intermediate longitudinal knives 115, 118 to each other. In other words, the upper ends of the intermediate longitudinal knives 118 project beyond the transverse end knife 120 and the rest of the blade assembly 110 in a claw-like manner.

Referring now to FIGS. 11, 12, and 14, multiple lower transverse knives 122 that are spaced from each other extend between the outer longitudinal knives 115, below or being closer to the shaft 105 than the transverse end knife 120. The lower transverse knives 122 have the same radius of curvature as the transverse end knife 120. The lower transverse knives 122 are narrower, for example, about one-half or about one-third as wide, as the transverse end knife 120.

Referring again to FIGS. 11-14, together, the interconnected curved longitudinal and transverse knives 115, 118, 120, 122 define the curved basket configuration of the blade is assembly, with opposing dished-in or concave and dished-out or convex sides. Within this curved basket of the blade assembly 110, the edges of the longitudinal and transverse knives 115, 118, 120, 122 that are on the concave side are chisel-sharpened or ground to sharp and thin edges, such that these sharpened edges cumulatively define a concave cutting surface of the blade assembly 110. The edges are sharpened to angles of less than about 25 or 20 degrees, for example, about 19 degrees. The longitudinal and transverse knives 115, 118, 120, 122 are made from stainless steel, for example, from a 2205 stainless steel alloy which can hold a sharp edge of about a 19 degree sharpened angle for extended periods of use. The opposing edges, i.e. those on the convex side of the longitudinal and transverse knives 115, 118, 120, 122 are flat, such that these unsharpened edges cumulatively define a convex stirring surface of the blade assembly 110.

Figure 7:
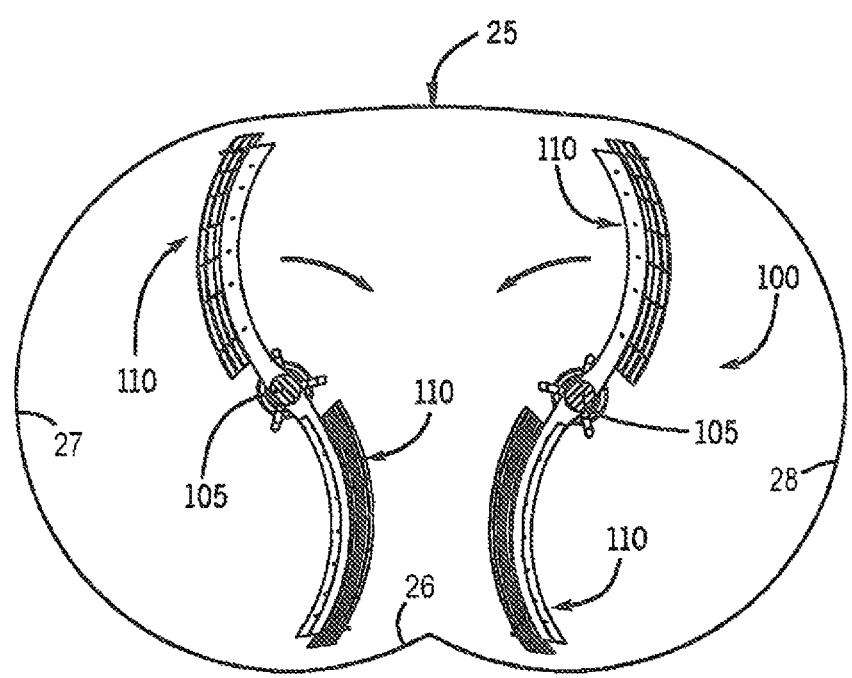
FIG. 7 is a partially schematic sectional view of the shell and agitator system of the vat system of FIG. 1, facing toward the drives.

Accordingly and referring now to FIG. 7, during use of this embodiment, the shafts 105 rotate in opposite directions and the arrows indicate the direction of rotation during a cutting procedure. While cutting, toward the middle of the vat 7, the blade assemblies 110 of both shafts 105 push downwardly, as a unit, against and cut through a horizontally extending columnar mass of the vat contents, while the blade assemblies 110 intermesh through each other (FIG. 5). Toward the outsides of the vat 7, the blade assemblies 110 simultaneously pull up and through the vat contents, adjacent the side walls 27, 28, while the shafts 105 rotate the blade assemblies 110 upwardly out of the vat contents and toward each other for collectively pushing downwardly through the common swept volume during the next rotational phase, in which the blade assemblies 110 again intermesh through each other. While performing a stirring procedure, the shafts 5 are rotated in the directions that are opposite those shown by the arrows. In so doing, the convex stirring surfaces face the direction of rotation of the shafts 5.

Referring now to FIGS. 8 and 10, as in FIG. 7, the arrows indicate the direction of rotation of the shafts 105 during a cutting procedure. Unlike the embodiment of FIG. 7, in the embodiments of FIGS. 8 and 10 the intermeshing cutting is performed while the blade assemblies 110 lift upwardly between the shafts 105. Accordingly, in the embodiments of FIGS. 8 and 10, while cutting, the blade assemblies 110 of both shafts 105 lift upwardly, as a unit, against and cut through a horizontally extending columnar mass of the vat contents in the middle common volume, while the blade assemblies 110 intermesh through each other (FIG. 5). Toward the outsides of the at 7, the blade assemblies 110 simultaneously push down and through the vat contents, adjacent the side walls 27, 28, while the shafts 105 rotate the blade assemblies 110 toward each other for collectively scooping under the common swept volume during the next rotational phase in which the blade assemblies 110 intermesh through each other, again. While performing a stirring procedure, the shafts 5 are rotated in the directions that are opposite those shown by the arrows. In so doing, the convex stirring surfaces face the direction of rotation of the shafts 5.

Referring now to FIG. 9, in this embodiment, the shafts 105 rotate in the same direction and the arrows indicate the direction of rotation during a cutting procedure. The blade assemblies 110 on the right-side shaft 105 are flipped with respect to those seen in FIG. 3. This ensures that all of the concave cutting surfaces of the blade assemblies 110 will face the direction of rotation of the respective shafts 105. In this embodiment, while cutting, the blade assemblies 110 of shafts 105 converge toward each other from above and below the common volume, cleaving through the mass of vat contents in the middle common volume, while the blade assemblies 110 intermesh through each other. Toward the outsides of the vat 7, the blade assemblies 110 of the shaft 105 shown on the left side push up through the vat contents along side wall 27 while the blade assemblies 110 of the shaft 105 shown on the right side push down through the vat contents along wall 28. Here too, a stirring operation is performed by rotating the shafts 105 in the directions that are opposite those shown by the arrows, so that the convex stirring surfaces face the direction of rotation of the shafts 5. In another embodiment, not shown, the convex side is the sharpened cutting surface and the concave side is the unsharpened stirring surface.

Various alternatives and embodiments are contemplated as being within the scope of the following claims particularly pointing out and distinctly claiming the subject matter regarded as the invention.

We claim:

1. A food processing vat system comprising:
a vat defining an inside space therein;
a pair of shafts transversely spaced from each other and that are rotatable within the inside space of the vat with each shaft defining a length; and
blade assemblies mounted to the shafts so that the blade assemblies travel through a common swept volume between the shafts,
wherein on each of the shafts, each blade assembly defines a blade assembly position as a longitudinal position of the respective shaft with the blade assembly extending generally radially away from the shaft in a first direction on a first side of the shaft, and wherein an opposite space is defined as an open space in a second opposite direction relative to each blade assembly at the respective longitudinal position on a second opposite side of the shaft, wherein each blade assembly is spaced from an adjacent blade assembly that extends in a common direction from the respective shaft at a different longitudinal position of the respective shaft, wherein the blade assemblies of the pair of shafts define a staggered arrangement with respect to each other along the lengths of the respective shafts and wherein the blade assemblies at common longitudinal positions on the shafts pass through the opposite spaces of each other, wherein the blade assemblies of the pair of shafts alternatingly pass through the common swept volume to intermesh through each other, and wherein each blade assembly of one of the pair of shafts passes through the opposite space relative to the corresponding blade assembly of the other of the pair of shafts during rotation of the pair of shafts; and
wherein each of the blade assemblies includes:
a first set of knives spaced from each other along a width of the respective blade assembly with each knife of the first set of knives having:
an inner knife end arranged toward the respective shaft;
an outer knife end that defines a terminal point of the knife and is arranged away from the respective shaft; and
a curved and sharpened edge that extends between the inner and outer knife ends in a longitudinal direction between the inner and outer knife ends from a position proximate the respective shaft toward the terminal point of the knife, wherein the curved and sharpened edge faces a direction of rotation of the respective shaft to cut through contents of the vat during food processing and the curved and sharpened edges of the first set of knives collectively provide a curved configuration of the blade assembly in a longitudinal direction of each of the blade assemblies; and
a second set of knives spaced from each other along a length of the respective blade assembly with each knife of the second set of knives extending between and intersecting the first set of knives.

2. The food processing vat system of claim 1, wherein the shafts rotate in opposite directions and the knives of the first set of knives collectively define a longitudinal curve of the respective blade assembly, wherein during rotation of the respective blade assembly, the outer knife ends enter the contents of the vat before intermediate segments of the knives of the first set of knives.

3. The food processing vat system of claim 1, wherein the shafts rotate in the same direction and the knives of the first set of knives collectively define a longitudinal curve of the respective blade assembly, wherein during rotation of the respective blade assembly, the outer knife ends enter the contents of the vat before intermediate segments of the knives of the first set of knives.

4. The food processing vat system of claim 1, wherein the blade assemblies of the shafts intermesh through each other and occupy the inside space between the shafts while simultaneously traveling through the common swept volume.

5. The food processing vat system of claim 1, wherein the blade assemblies on each of the shafts are transversely spaced from adjacent ones of the blade assemblies on the respective shaft, and wherein staggered blade assemblies of the shafts simultaneously pass adjacent to each other through a space defined between the shafts and radially aligned blade assemblies of the shafts alternate passing through the space defined between the shafts.

6. The food processing vat system of claim 1, wherein at each blade assembly, sharpened edges of the knives of the first and second sets of knives collectively provide a cutting surface that faces different directions at different locations along the length of the blade assembly.

7. The food processing vat system of claim 1, wherein each of the shafts supports blade assemblies that extend in opposite directions.

8. A food processing vat system comprising:
a vat defining an inside space therein;
a pair of shafts that are rotatable within the inside space of the vat; and
multiple blade assemblies mounted to each of the shafts, wherein the blade assemblies of the pair of shafts define a staggered arrangement with respect to each other along the lengths of the respective shafts, wherein radially aligned pairs of blade assemblies of the pair of shafts alternate passing through a common space between the pair of shafts during rotation of the shafts and wherein staggered blade assemblies of the pair of shafts intermesh through each other during rotation of the pair of shafts;
wherein on each of the shafts, each blade assembly:
is spaced from an adjacent blade assembly on the respective shaft;
defines a blade assembly length that extends generally radially away from the respective shaft;
defines a blade assembly width that extends generally parallel to the shaft; and
includes a first set of knives that defines a set of curved longitudinal knives that extend along the blade assembly length, and wherein the curved longitudinal knives:
are transversely spaced from each other along the blade assembly width and extend generally radially away from the respective shaft and wherein the curved longitudinal knives include:
edges that are sharpened and curve along the blade assembly length and are configured so that outer ends of the curved longitudinal knives enter contents of the vat before intermediate segments of the curved longitudinal knives during rotation of the pair of shafts; and
terminal points that are defined at outer knife ends that are distal relative to the respective shaft.

9. The food processing vat system of claim 8, wherein the first set of knives faces different directions at different locations along the length of the blade assembly, and wherein the blade assembly includes a second set of knives spaced from each other and transversely interconnecting the knives of the first set of knives to each other with the second set of knives facing different directions at different locations along the width of the blade assembly.

10. The food processing vat system of claim 8, wherein each of the blade assemblies is curved along both the length and the width thereof.

11. A food processing vat system comprising:
a vat defining an inside space therein;
a shaft that is rotatable about a rotational axis within the inside space of the vat; and
multiple blade assemblies supported by and arranged at different positions relative to the shaft; wherein each blade assembly:
has a blade assembly length that is defined in a direction that extends generally radially away from the shaft, and
has a blade assembly width that is defined in a direction that extends generally parallel to the shaft,
wherein each blade assembly includes:
a pair of longitudinal knives that extend generally radially away from the shaft and along the blade assembly length, and
a set of curved transverse knives that extends between the longitudinal knives and along the blade assembly width, and wherein the curved transverse knives:
are spaced from each other along the length of the respective blade assembly and radially spaced with respect to the shaft, wherein the curved transverse knives are arranged generally parallel to the shaft;
have sharpened edges that are configured to cut through contents of the vat during food processing and that face a rotational direction of the shaft; and
are curved along the width of the blade assembly, wherein intermediate portions of the curved transverse knives extend outwardly farther with respect to the rotational axis of the shaft than knife ends of the curved transverse knives, wherein each curved transverse knife extends between the knife ends along an arc that extends along a portion of an axial length of the respective shaft.

12. The food processing vat system of claim 11, wherein the blade assembly includes a set of longitudinal knives spaced from each other and arranged generally perpendicularly to the shaft and have curved and slurped edges that face the rotational direction of the shaft, the set of longitudinal knives longitudinally interconnecting the set of transverse knives to each other.

13. The food processing vat system of claim 11, wherein the blade assembly is curved along both the length and the width thereof.

* * * * *

UNITED STATES PATENT AND TRADEMARK OFFICE
CERTIFICATE OF CORRECTION

PATENT NO. : 10,278,541 B2
APPLICATION NO. : 14/793200
DATED : May 7, 2019
INVENTOR(S) : Timothy J. Isenberg et al.

It is certified that error appears in the above-identified patent and that said Letters Patent is hereby corrected as shown below:

In the Claims

Claim 12, Column 10, Line 42, delete "slurped" and substitute therefore -- sharpened --.

Signed and Sealed this
Twenty-fifth Day of June, 2019

Andrei Iancu
*Director of the United States Patent and Trademark Office*